(12) United States Patent
Boukari

(10) Patent No.: US 11,279,638 B2
(45) Date of Patent: Mar. 22, 2022

(54) MOBILE DEVICE FOR TREATING WATER

(71) Applicants: PRODOSE, Bessieres (FR); Morou Boukari, Toulouse (FR)

(72) Inventor: Morou Boukari, Toulouse (FR)

(73) Assignees: PRODOSE, Bessieres (FR); Morou Boukari, Toulouse (FR)

( * ) Notice: Subject to any disclaimer, the term of this patent is extended or adjusted under 35 U.S.C. 154(b) by 0 days.

(21) Appl. No.: 16/838,357

(22) Filed: Apr. 2, 2020

(65) Prior Publication Data

US 2020/0317551 A1 Oct. 8, 2020

Related U.S. Application Data

(60) Provisional application No. 62/828,625, filed on Apr. 3, 2019.

(51) Int. Cl.
| | |
|---|---|
| C02F 1/68 | (2006.01) |
| B08B 3/02 | (2006.01) |
| C02F 1/02 | (2006.01) |

(52) U.S. Cl.
CPC .............. *C02F 1/687* (2013.01); *C02F 1/02* (2013.01); *C02F 2201/008* (2013.01); *C02F 2209/02* (2013.01); *C02F 2209/40* (2013.01)

(58) Field of Classification Search
CPC .................................................... B08B 9/032
USPC ............................................ 210/181; 134/1
See application file for complete search history.

(56) References Cited

U.S. PATENT DOCUMENTS

| | | | | |
|---|---|---|---|---|
| 3,522,909 A | * | 8/1970 | Perry ..................... | B08B 3/026 239/127 |
| 5,498,329 A | * | 3/1996 | Lamminen ......... | B01D 17/0217 210/86 |
| 5,550,976 A | * | 8/1996 | Henderson ............ | G06F 16/289 709/201 |
| 6,251,279 B1 | * | 6/2001 | Peterson ................... | A61L 2/04 134/22.11 |

(Continued)

FOREIGN PATENT DOCUMENTS

| | | |
|---|---|---|
| EP | 1 289 890 B1 | 4/2006 |
| EP | 2 718 033 B1 | 8/2016 |

(Continued)

OTHER PUBLICATIONS

Air Products Safetygram 30 "Handling Liquefied compress gas", Air Products and Chemicals, Inc., 2013 (36219) 900-13-108-US (Year: 2013).*

*Primary Examiner* — Nina Bhat
(74) *Attorney, Agent, or Firm* — Nixon & Vanderhye

(57) ABSTRACT

A mobile device for services related to providing hot water, to water treatment, to cleaning of any fixed or mobile surfaces like lines for proving potable water or food liquid, that includes an internal chassis housing in a lower part a tank for recovering possible fluids and a sub-assembly for producing hot water with at least one condensing boiler associated with at least one module for supplying gas formed by a plurality of gas cylinders storing in their internal volume the gas in liquid state in the lower part and in gaseous state in the upper part, the gas cylinders being disposed in the internal chassis substantially horizontally and with an opening orifice oriented upwards so that an end of a pipe for passage of the gas opens onto a larger elongated gaseous part.

11 Claims, 3 Drawing Sheets

(56) References Cited

U.S. PATENT DOCUMENTS

| | | | | |
|---|---|---|---|---|
| 7,307,056 | B2* | 12/2007 | Boukari | C01B 15/14 |
| | | | | 106/287.1 |
| 8,721,805 | B2* | 5/2014 | Barrios | B60P 3/22 |
| | | | | 134/115 R |
| 9,694,397 | B2* | 7/2017 | Boukari | B08B 9/0321 |
| 9,790,114 | B2* | 10/2017 | Boukari | C02F 1/008 |
| 9,821,350 | B2* | 11/2017 | Boukari | F24H 8/00 |
| 10,240,241 | B2* | 3/2019 | Boukari | C25B 9/19 |
| 10,703,510 | B2* | 7/2020 | Allen | B08B 17/025 |
| 10,728,365 | B2* | 7/2020 | Boukari | G06F 16/29 |
| 10,766,058 | B2* | 9/2020 | Boukari | B08B 13/00 |
| 2004/0217183 | A1* | 11/2004 | Bae | B08B 3/00 |
| | | | | 239/8 |
| 2008/0128032 | A1* | 6/2008 | Lapetina | B08B 3/026 |
| | | | | 137/334 |
| 2012/0031439 | A1* | 2/2012 | Richie | B08B 9/00 |
| | | | | 134/34 |
| 2013/0094994 | A1* | 4/2013 | Risch | B64D 11/02 |
| | | | | 422/26 |
| 2016/0236247 | A1* | 8/2016 | Boukari | B64D 11/04 |
| 2016/0251090 | A1* | 9/2016 | Boukari | B08B 9/0321 |
| | | | | 134/1 |
| 2018/0085796 | A1* | 3/2018 | Boukari | B64F 5/30 |

FOREIGN PATENT DOCUMENTS

| | | |
|---|---|---|
| EP | 3 021 989 B1 | 6/2017 |
| EP | 3 055 080 B1 | 3/2018 |
| FR | 2 946 622 A1 | 12/2010 |
| FR | 3 011 754 A1 | 4/2015 |

* cited by examiner

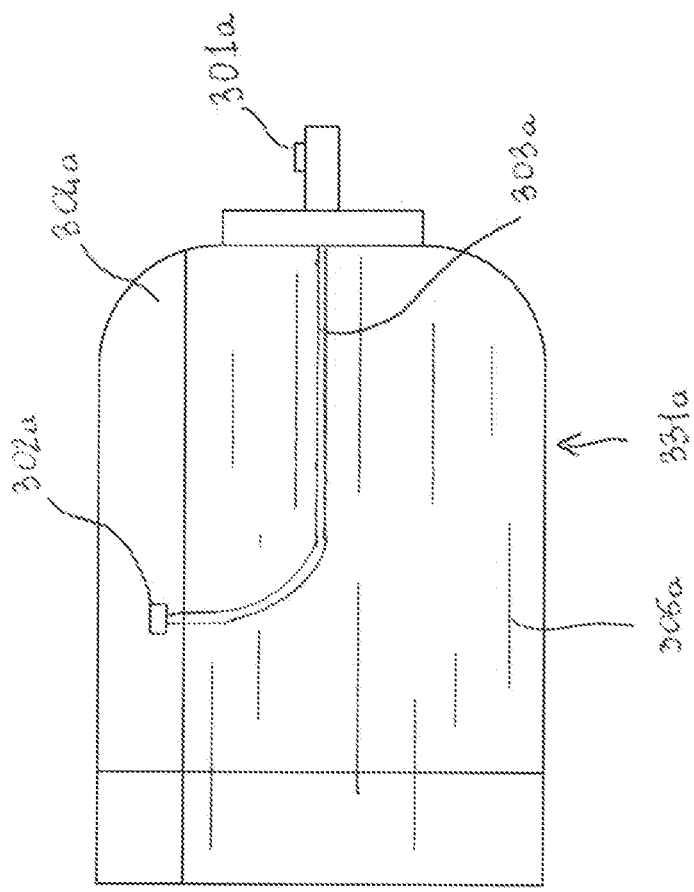

MOBILE DEVICE FOR TREATING WATER

FIELD OF THE INVENTION

The invention relates to the providing, by a mobile device, of a plurality of services related to providing hot water, to water treatment, to the cleaning of lines for providing potable water or food liquid.

DESCRIPTION OF THE PRIOR ART

In the prior art, there are various devices and methods related to the treatment of water, to the cleaning of lines and to providing hot water. Certain documents proposing these solutions are described below.

The document EP1289890 describes a device for metering a reactant by dissolution in a flow of liquid.

The document FR2946622 describes a method for treating the potable-water circuit of an aircraft, device and aircraft allowing to implement it.

The document FR3011754 describes a treatment method for purposes of cleaning the lines of a potable-water network of an aircraft.

The document EP2718033 describes a method for dynamic cleaning of the water lines of a vehicle and device allowing to implement it.

The document EP3055080 describes a treatment method for purposes of cleaning the lines of a potable-water network of an aircraft.

The document EP3021989 describes a device for cleaning the lines of the potable-water network of an aircraft. This document describes in particular a device independent of the aircraft that is connected to said network occasionally and is supplied with liquid. This device comprises a plurality of functional elements necessary for the production of a hot liquid as well as a mobile chassis supporting a closed-furnace condensing gas boiler, said device housing a plurality of gas cylinders proposing a sufficient volume of gas capable of providing the energy necessary for the production of a large quantity of heat over a very short period.

BRIEF DESCRIPTION OF THE INVENTION

The applicants have carried out research aimed at a use of the last device described on a greater volume. This research has led to the design and to the creation of a mobile device combining a plurality of functional subassemblies implementing not only the functions of the last device described on a greater volume but also the other methods and device.

In general, this mobile device of the invention proposes services related to providing hot water, to water treatment, to the cleaning of any fixed or mobile surfaces like aircraft engines, of lines for providing potable water or food liquid.

The multiplication and/or the oversizing of the technical means for purposes of treating a large volume, the combination in a single mobile device with constraints of bulk and of mass had, as consequences, new technical problems solved by the features of the invention.

According to the invention, the device for services related to providing hot water, to water treatment, to the cleaning of any fixed or mobile surfaces is remarkable in that it is mobile and comprises an internal chassis housing in the lower part a tank for recovering possible fluids and a subassembly for producing hot water with at least one condensing boiler associated with at least one module for supplying gas formed by a plurality of gas reservoirs storing in their internal volume the gas in the liquid state in the lower part and in the gaseous state in the upper part, said reservoirs each being equipped with a pipe for passage of the gas connecting the upper part containing the gas in the gaseous state to an opening orifice.

The gas drawn is thus systematically in the gaseous phase. The presence of a carburetor and/or of a vaporizer is no longer necessary, which avoids additional equipment between the boiler(s) and the reservoirs. The upper volume of the cylinder is used as an evaporation chamber.

This feature thus avoids investments, saves on the volume and the weight of the load to be transported.

Also according to the invention, the device for services related to providing hot water, to water treatment, to the cleaning of any fixed or mobile surfaces is remarkable in that the device is mobile, comprises an internal chassis housing in the lower part a tank for recovering possible fluids and a subassembly for producing hot water with at least one condensing boiler associated with at least one module for supplying gas formed by a plurality of gas cylinders of the carburation type storing in their internal volume the gas in the liquid state in the lower part and in the gaseous state in the upper part, said gas cylinders being disposed in the internal chassis substantially horizontally and with the opening orifice oriented upwards so that the end of the pipe for passage of the gas opens onto a larger elongated gaseous part.

The presence of the chassis is used as an interface for positioning and maintaining in position between the walls of the vehicle formed by the device and the functional subassemblies. It allows to house said cylinders according to an optimized orientation. The presence of a tank for recovering possible fluids avoids the accumulation of fluids in this volume.

The device of the invention comprises at least one inlet duct and electrical cables for connecting to a source for supplying cold water as well as to a source for supplying electricity. The gas necessary for the boilers is stored in the cylinders that are transported by the device.

The device of the invention further comprises at least one outlet duct allowing it to connect to the facility requiring its intervention like:
 the potable-water network of a vehicle such as an aircraft,
 the lines of a facility in which a food liquid circulates,
 a water network requiring hot water,
 any fixed or mobiles surfaces to be cleaned like aircraft engines,
 etc.

The advantage of such a device is that it allows to group together in the same mobile volume a plurality of functional subassemblies capable of implementing in combination or not a plurality of services related to the use of the facilities listed above.

The mobile device is a vehicle of the truck or van type equipped with a useful volume in which the chassis and the various subassemblies on the chassis are disposed.

Said functional subassemblies housed on the chassis are the following:
 subassembly for producing hot water,
 subassembly for treating liquid,
 subassembly for metered injection of cold water,
 etc.

In order to product the hot water in a greater volume and still in a very short time, the subassembly for producing hot water comprises a plurality of independent condensing gas boilers. This subassembly multiplies the facilities described in the document EP3021989 in order to multiply its capabilities.

According to a preferred but non-limiting embodiment, the subassembly combines together three independent identical boilers.

The multiplication of the boilers to heat water coming from the same source and to provide hot water to the same destination requires particular features.

Thus, according to the invention, the device comprises a duct for inlet of the cold water and a duct for outlet of hot water, the order of supply of water to the boilers because of their position with respect to the duct for inlet of the cold water is inversed with respect to the order of outlet of hot water due to their position with respect to the duct for outlet of the hot water.

The functional subassembly for treating liquid is a subassembly for treating liquid by dissolution of a solid treatment product in a flow of said liquid, said solid treatment product being packaged in the form of tablets stacked in interchangeable cartridges. According to the invention, this subassembly is remarkable in that the base into which said cartridge is inserted is equipped with a tank for recovering the water capable of leaking during the changing of the cartridge.

This feature avoids the projection of liquid coming from this subassembly into the useful volume.

The subassembly for metered injection of cold water comprises a cold-water metering pump injecting the cold water into the outlet duct of the device to regulate the flow and the temperature.

The boilers are supplied with electricity by being plugged into the power grid. The device of the invention comprises, in addition to a module for supplying gas, a module for supplying electricity equipped with a means for controlling polarity verifying that the latter is compatible with the power supply of the boilers, a rectifier being activated if not.

The fundamental concepts of the invention that has just been described above in their most elementary form, other details and features will be clearer upon reading the following description and with regard to the appended drawings, giving as a non-limiting example an embodiment of a device according to the invention.

BRIEF DESCRIPTION OF THE DRAWINGS

FIG. 3 is a diagram of a cross-sectional view of a carburation gas cylinder.

DESCRIPTION OF AN EMBODIMENT

Figure 1:
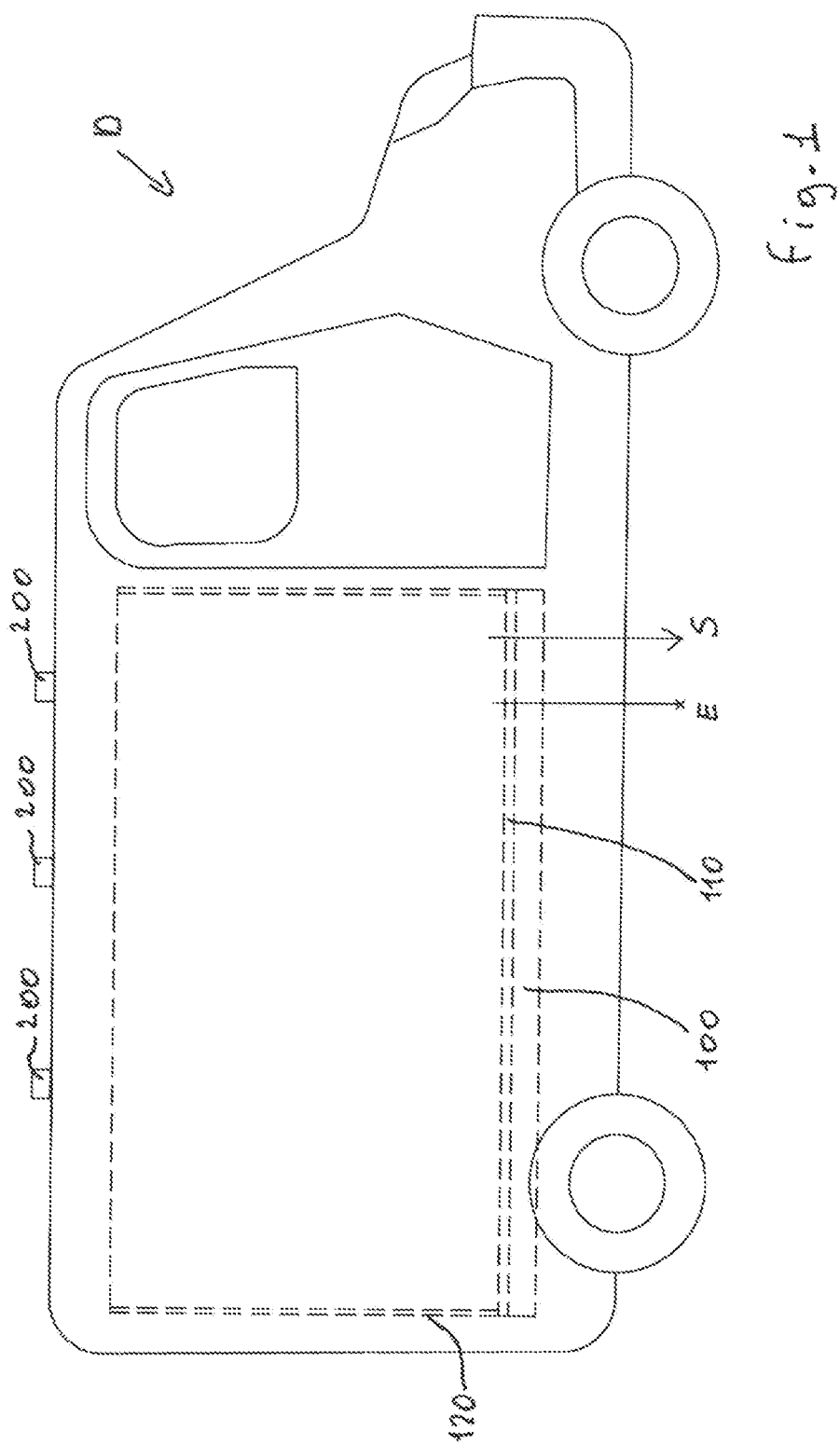
FIG. 1 shows an example of a vehicle housing the functional subassemblies of the device.

As illustrated in the drawing of FIG. 1, the device labelled as D overall is a self-propelled mobile device such as a truck or a van that houses in its rear part or useful volume a plurality of functional subassemblies necessary for services of providing hot water, of cleaning ducts for water or for food liquid.

This device D moves on its site of use like an aircraft workshop for purposes of cleaning the ducts forming the potable-water network of an airplane.

The device D is equipped with a duct E for inlet of liquid and with a duct S for outlet of the liquid that has passed through at least one of the functional subassemblies with which the device D is equipped.

As illustrated, the lower part of the useful volume is occupied by a tank 100 for recovering the fluids and by a grating 110 disposed on the tank 100. The upper portion houses a chassis 120 for supporting the various functional subassemblies. The upper wall of the truck is provided with openings 200 to let the gases escape.

Figure 2:
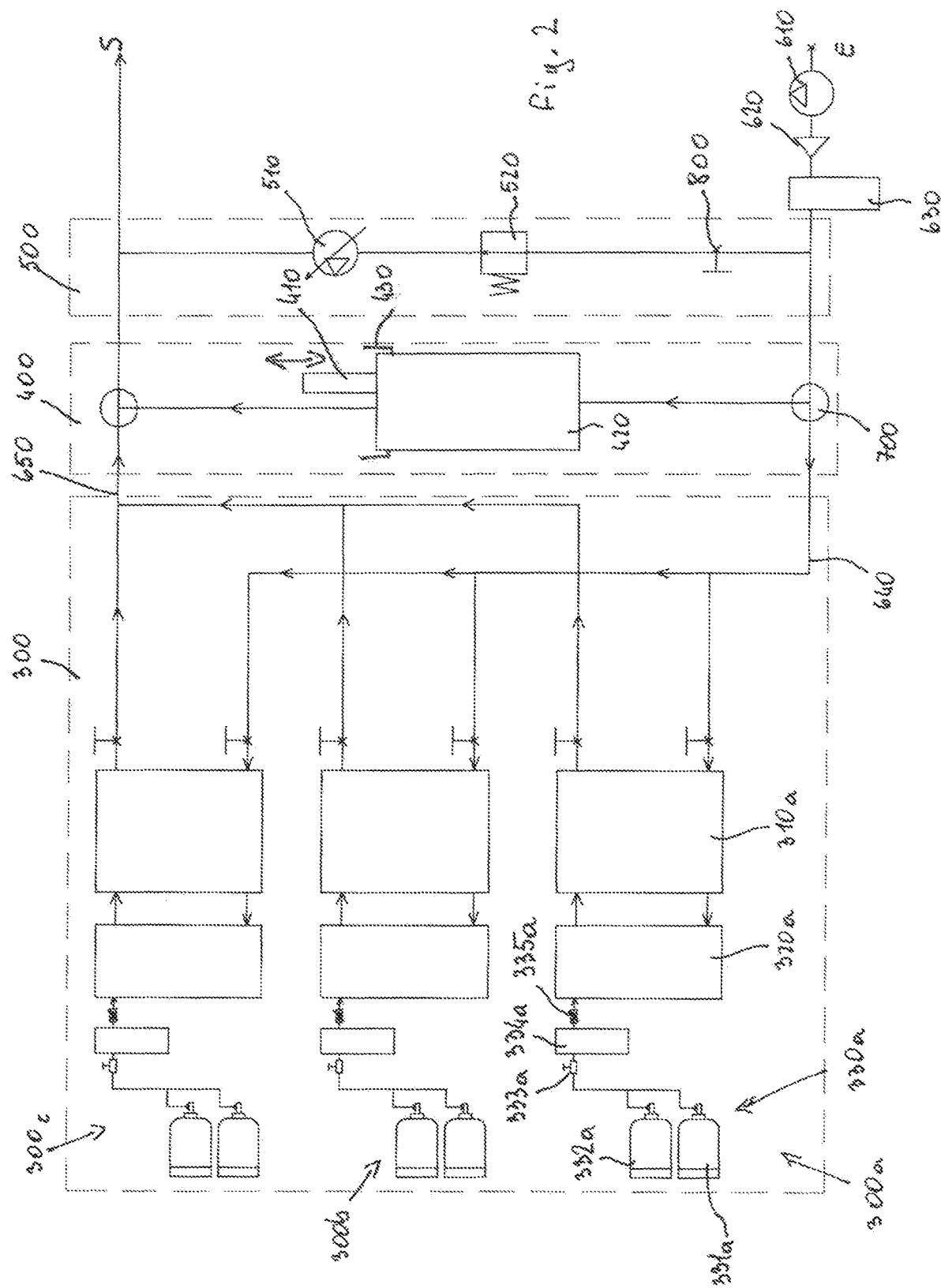
FIG. 2 is a diagram illustrating the various functional subassemblies of the device.

The schema of FIG. 2 illustrates, starting from the inlet duct E, the various functional subassemblies through which the water that can come from the potable-water network of the site of use of the device can pass.

This water can be treated according to the methods and by the devices described in the documents of the prior art cited above and/or for implementing the methods described in said documents.

According to the invention, the device D comprises:
a subassembly 300 for producing hot water,
a subassembly 400 for treating liquid,
a subassembly 500 for metered injection of cold water.

Upstream of these functional subassemblies, a general pump 610 associated with a check valve 620 and with a filtration module 630 move and filter the water coming from the inlet E.

These subassemblies can operate simultaneously or separately according to the method to be implemented, three-way valves 700 or faucets 800 actuated automatically or by an operator allow to select between separate or simultaneous operations.

The subassembly 300 for producing hot water comprises three identical modules 300a, 300b, 300c for producing hot water mounted in parallel starting from a duct 640 bringing the water coming from the filtration module 630. According to the invention, these modules operate simultaneously but can be the subject of a stoppage for purposes of maintenance operations. Faucets or valves allow to isolate the modules.

Only the module 300a is precisely described. This module 300a comprises an exchanger 310a and a boiler 320a. As described above, this is a closed-furnace condensing gas boiler. The gas is provided by a module for supplying gas labelled as 330a. The module for supplying gas comprises two cylinders 331a and 332a of the carburation type disposed as described above horizontally with orifices oriented upwards. The gas coming from the cylinders passes through a membrane expansion valve 333a then into a flash tank 334a and through a flow regulator 335a before supplying the boiler 320a.

The judicious orientation of the cylinders 331a and 332a allows the use of a membrane expansion valve 333a and one of the tank type 334a without requiring a carburetor. The water becomes hot at the exchanger 310a.

As illustrated by FIG. 3 for the cylinder 331a, the upwards orientation of the opening orifice 301a of a carburation gas cylinder of 13 kg of propane like that illustrated allows to systematically dispose the end 302a of the internal pipe 303a for passage of gas in the part of the internal volume of the cylinder 331a corresponding to the vapor space 304a and not to the volume of liquefied gas 305a.

These cylinders are transported in the device D. The device is thus independent with regard to the supply of gas. The supply of electricity is provided by plugging into the network but via a power supply module (not shown) equipped with a device for verifying the phases in order for it to be compliant with the operation of the boilers. In the case of a non-compliant phase, a rectifier (not shown) is used.

As illustrated, although identical, the modules 300a, 300b and 300c are disposed in a certain order (from upstream to downstream) with respect to the supply flow coming from the cold-water duct 640. In order to avoid a module operating more than another, the order defined by the position of the module with regard to the duct 640 for inlet of cold water is inversed with respect to the order defined by the position of the module (that is to say with regard to the duct for outlet of hot water). Thus, since the module 300a is the first supplied with cold water by the duct 640, the module 300b being supplied second and the module 300c third, the hot water coming from the module 300c corresponds to the duct 650 for outlet of hot water into which the hot water coming from the farther module 300b mixed with the hot water coming from the farthest module 300a is injected.

The subassembly 400 for treatment of the water treats the water coming from the inlet E and is equipped with at least one interchangeable cartridge 410 containing treatment products in tablets dissolving under the action of the moving water as described in a plurality of the documents of the prior art. This cartridge 410 is removably fastened onto a body 420 through which the water to be treated passes. According to the invention, this body is equipped around the orifice in which the cartridge 410 is housed with a tank 430 for recovering the water that flows during the changing of the cartridge 410.

The three-way valves 700 allow to use or not use this subassembly 400. The use of three-way valves avoids the use of the treatment subassembly 400 with the subassembly 300 for producing hot water in order for the chemical treatment to not be neutralized by the hot water.

The subassembly 500 for metered injection of cold water uses the water coming from the inlet E and comprises a metering pump 510 disposed downstream of a pressure-relief valve 520 and of the faucet 800 in order to inject, into the outlet duct of the device, the cold water to regulate if necessary the volume of water treated, the flow and the temperature of the water coming from the other functional subassemblies.

It is understood that the device that has just been described and shown above has been described and shown with a view to disclosure rather than limitation. Of course, various arrangements, modifications and improvements can be made to the above examples without going beyond the context of the invention.

The invention claimed is:

1. A mobile device (D) for services related to providing hot water, water treatment, and cleaning of any fixed or mobile surfaces, said device comprising:
an internal chassis (120); and
a tank (100) for recovering fluids,
the internal chassis including a first subassembly (300) for producing hot water with at least one condensing boiler (320a) associated with at least one module (330a) for supplying gas formed by a plurality of gas cylinders (331a, 332a) storing the gas in internal volumes thereof, the gas being in a liquid state in a lower part of said internal volumes and in a gaseous state in an upper part of said internal volumes,
said gas cylinders being disposed in the internal chassis (120) substantially horizontally and with an opening orifice oriented upwards so that an end of a pipe for passage of the gas opens onto a larger elongated gaseous part,
wherein said device further comprises:
a second subassembly for injecting and metering a treatment product (400), said treatment product injected into the hot water at an outlet of the device; and
a third subassembly for metered injection of cold water (500), and
wherein the second subassembly (400) for injecting and metering a treatment product is configured for treating liquid by dissolution of a solid treatment product in a flow of said liquid, said solid treatment product being packaged as tablets stacked in interchangeable cartridges (410) being removably fastened in a base of the second subassembly (400), the base into which said cartridge is inserted being equipped with a tank (430) for recovering the water capable of leaking during changing of the cartridge (410).

2. A mobile device (D) for services related to providing hot water, water treatment, and cleaning of fixed or mobile surfaces, comprising:
an internal chassis (120); and
a tank (100) for recovering possible fluids,
the internal chassis including a first subassembly (300) for producing hot water with at least one condensing boiler (320a) associated with at least one module (330a) for supplying gas formed by a plurality of gas reservoirs, each one of said gas reservoirs having an internal volume storing the gas therein, said gas being in a liquid state in a lower part of the internal volume and in a gaseous state in an upper part of the internal volume,
said reservoirs each being equipped with a pipe for passage of the gas, said pipe connecting an opening orifice to the upper part containing the gas in the gaseous state,
wherein said device further comprises:
a second subassembly for injecting and metering a treatment product (400), said treatment product injected into the hot water at an outlet of the device; and
a third subassembly for metered injection of cold water (500), and
wherein the second subassembly (400) for injecting and metering a treatment product is configured for treating liquid by dissolution of a solid treatment product in a flow of said liquid, said solid treatment product being packaged as tablets stacked in interchangeable cartridges (410) being removably fastened in a base of the second subassembly (400), the base into which said cartridge is inserted being equipped with a tank (430) for recovering the water capable of leaking during changing of the cartridge (410).

3. The device according to claim 1, further comprising:
at least one inlet duct (E) for connection to a source for supplying water, and electrical cables for connection to a source for supplying electricity; and
at least one outlet duct (S).

4. The device according to claim 1, further comprising:
a vehicle,
said chassis disposed inside a volume of said vehicle.

5. The device according to claim 1, wherein the first subassembly (300) for producing hot water comprises a plurality of independent condensing gas boilers.

6. The device according to claim 5, further comprising:
a duct (E) for inlet of the cold water; and
a duct (S) for outlet of the hot water, an order of supply of the cold water to the boilers being inverse to an order of outlet of the hot water.

7. The device according to claim 1, wherein the third subassembly (500) for metered injection of cold water comprises a cold-water metering pump configured for injecting the cold water into the outlet duct of the device to regulate flow and temperature.

8. The device according to claim 1, further comprising:
a module for supplying electricity equipped with a means for controlling polarity verifying that said polarity is compatible with a power supply of the boilers, said module configured to activate a rectifier in a condition where said polarity is determined to be incompatible with said power supply.

9. The device according to claim 2, further comprising:
at least one inlet duct (E) for connection to a source for supplying water, and electrical cables for connection to a source for supplying electricity; and
at least one outlet duct (S).

10. The device according to claim 2, wherein the first subassembly (300) for producing hot water comprises a plurality of independent condensing gas boilers.

11. The device according to claim 2, further comprising:
a module for supplying electricity equipped with a means for controlling polarity verifying that said polarity is compatible with a power supply of the boilers, said module configured to activate a rectifier in a condition where said polarity is determined to be incompatible with said power supply.

\* \* \* \* \*